United States Patent Office 3,507,100
Patented Apr. 21, 1970

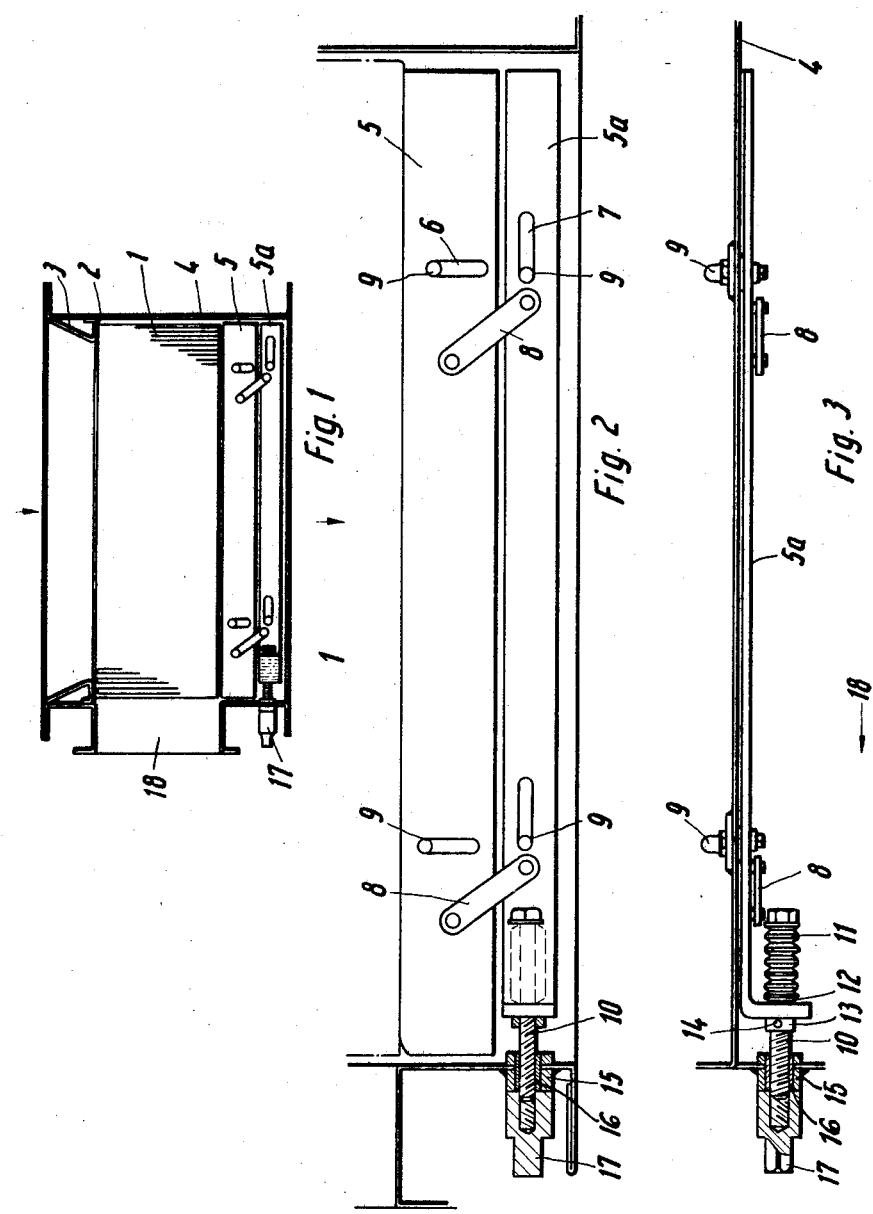

3,507,100
THRUST GENERATING MEANS FOR PRESSING FILTER PACKS OR FILTER CELLS
Gerhard Max Neumann, Berlin-Dahlem, Germany, assignor to Delbag Luftfilter G.m.b.H., Berlin-Halensee, Germany
Filed Dec. 11, 1967, Ser. No. 689,505
Claims priority, application Germany, Sept. 2, 1967, D 54,009
Int. Cl. B01d 46/54
U.S. Cl. 55—502                7 Claims

ABSTRACT OF THE DISCLOSURE

A filtering device having the filter held in place in a filter casing by a thrust generating device, the thrust generating device having two sets of bars within the filter casing, one set moving vertically against the filter in response to horizontal movement of a further pair of bars, the horizontal moving bars being actuated by a screw shaft passing through the casing wall, the screw rod being substantially outside the casing when maximum vertical displacement of the one set of bars has been effected.

---

This invention relates to thrust generating means for pressing filter packs or filter cells against co-operating sealing faces in their casings.

Thrust generating means of such a kind are so contrived that an external force applied to them is converted into a force acting perpendicularly thereto, so that the filter pack or cell is pressed against the sealing faces. The sealing thrust is applied through interposed powerful springs which are capable of automatically compensating any gradual slackening of the thrust. Since the filters must be exchangeable, and in nuclear plants this cannot be done without taking special precautions and without the use of a tightly fitting protective handling bag, it is necessary for this purpose that the actuating means of the thrust generating device pass through a gas-tight bushing in the wall of the casing.

For the above described purpose one known arrangement includes a lazy tongs toggle lever arrangement operable by screw shafts which extend through the entire casing. Because of the risk of corrosion, the presence of such screw shafts is not desirable in the space through which the gas or air flow proceeds. Moreover, the mechanism occupies considerable space because the spring transmitting the thrust is mounted on the toggle lever device, necessitating the provision of a thrust transmitting frame for co-operation with the filter elements. In a different known arrangement the toggle levers are mounted on the spring, the linkage being used for actuation. This arrangement still takes up considerable space and involves the difficulty of sufficiently sealing the actuating rod where this passes through the casing wall.

Such a difficulty also arises in other arrangements in which use is made of rod linkages. Furthermore such arrangements also usually require the provision of frames for applying the thrust to the filter packs or cells. The fact that these frames naturally occupy space is likewise undesirable.

It is an object of the invention to avoid such disadvantages in thrust generating devices, more particularly to avoid the necessity of using thrust transmitting frames, and also to reduce the space requirements and to eliminate sealing difficulties by making use of screw shafts which in a thrust applying position are substantially withdrawn from the casing. In the arrangement of the invention, a lifting and lowering motion transmitted to the filter packs or filter cells cannot tip the said packs or cells, so that supplementary guide means can be dispensed with and reliable operation assured in any position of the filter casing.

The invention consists of a thrust generating mechanism for pressing filter packs or filter cells against co-operating sealing faces in their containing casings with the interposition of spring means, comprising a casing, a first pair of thrust-transmitting bars horizontally movable in the said casing, a second pair of thrust transmitting bars vertically movable in the said casing, a link mechanism connecting a bar of the pair of horizontally movable bars with a corresponding bar of the pair of vertically movable bars, whereby horizontal movement of the pair of horizontally movable bars causes vertical movement of the pair of vertically movable bars, a screw shaft mounted in a casing wall engagingly connected with a bar of the pair of horizontally movable bars whereby rotation of the screw shaft imparts a horizontal movement to the said pair of horizontally movable bars.

In a preferred embodiment of this arrangement the spring consists of a stack of dish springs mounted directly on the screw shaft with their concavities alternately facing opposite directions.

In order to create an adequate seal a cup-shaped nut for displacing the screw shaft may be rotatably inserted in sealing manner into the strengthened wall of the casing.

An embodiment of the invention is hereinafter described and illustrated in the accompanying drawing, in which FIGURE 1 is a vertical section of a filter pack casing, showing the thrust generating means included therein, FIGURE 2 is a part sectional view of the thrust generating means shown in FIGURE 1 on a larger scale, and FIGURE 3 is a part sectional view from below of the said thrust generating means.

Referring to FIGURE 1, a seal 2 consisting of rubber or a like flexible material on top of the filter pack or cell 1, is pressed against sealing faces 3 in the casing containing the pack. This pressure is generated by thrust applying means which according to the invention comprises two pairs of movable bars. Only one bar of each pair can be seen in the drawing. Thus one pair of bars which includes the bar 5, is adapted to be raised and lowered in vertical slots 6 by the second pair of bars, which includes the bar 5a. The latter pair of bars (i.e. including 5a) is horizontally movable and guided by horizontal slots 7. This horizontal motion is transmitted by links 8 as a vertical motion to the other pair of bars including bar 5. Pins 9 which slidably engage the slots are fitted into the walls of the casing 4.

Horizontal movement is imparted to the pair of bars 5a by a screw shaft 10 which moves the angled end 12 of the bar 5a horizontally through an interposed stack of dish springs 11. The dish springs 11 are stacked with their concavities alternately facing opposite directions and they are directly mounted on the screw shaft 10. The screw shaft 10 carrying the springs 11 is provided with a collar 13 secured by a split pin 14, the springs urging the collar into contact with the other side of the angled end 12 of the bar. Fitted into the wall of the casing 4, for instance by welding, is a bushing 15 which strengthens the wall at this point and contains a seal 16 embracing the screw shaft 10. The screw shaft is axially displaceable by a cup-shaped nut 17. When this nut 17 is rotated, causing the screw shaft to displace the pair of bars 5a in the direction of arrow 18, vertical thrust is transmitted to the second pair of bars 5 by the links 8. This upward thrust is applied by the bars to the filter pack 1 which in turn presses the seal 2 against the sealing faces 3. Since the screw shaft 10 has a self-locking action, the bars remain in any position into which they may be raised and lowered. Moreover, in the thrust applying position of the bars any slackening of the sealing pressure is automatically compensated by expansion of the set of dish springs 11. It will be understood that when the pair of bars 5 is in the fully upwardly displaced position, the fully-tensioned screw shaft 10 projects practically not at all into the space through which the flow of gas or air passes. The actuating means, particularly the cup-shaped nut 17, are located below the opening 18 provided for the replacement of the filter pack 1 and, although the screw shaft passes through the wall of the casing 4, this does not give rise to difficulties in maintaining a seal.

Thus the entire arrangement is extremely compact and requires no special guide means and, more particularly, a special thrust frame is not needed because the thrust is directly applied by the pair of bars 5 to the filter pack. Nevertheless the thrust is resiliently applied.

What is claimed is:

1. A thrust generating and pressing mechanism comprising a casing, a seal connected to said casing, a first pair of thrust-transmitting bars horizontally movable in the said casing, a second pair of thrust transmitting bars vertically movable in the said casing, a filter pack or cell located between said seal and said second pair of thrust transmitting bars, a link mechanism connecting a bar of the pair of horizontally movable bars with a corresponding bar of the pair of vertically movable bars, whereby horizontal movement of the pair of horizontally movable bars causes vertical movement of the pair of vertically movable bars, a screw shaft mounted in a casing wall engagingly conected with a bar of the pair of horizontally movable bars with the screw shaft located substantially outside of said casing wall when said horizontally movable bars are in a pressing position whereby rotation of the screw shaft imparts a horizontal movement to the said pair of horizontally movable bars to selectively cause said filter pack or cell to be tightly pressed into sealing engagement with said seal.

2. A thrust generating mechanism according to claim 1, in which movement of the said horizontally and vertically movable bars is guided by guide pins engaging in slots in said bars.

3. A thrust generating mechanism according to claim 1, in which spring means are interposed between the end of the screw shaft within the casing and the part of the horizontally movable bar engaging the said screw shaft.

4. A thrust generating mechanism according to claim 3, in which the said spring means comprise a set of stacked dish springs mounted on the said screw shaft in alternatively oppositely-facing directions.

5. A thrust generating mechanism according to claim 1, in which the said screw shaft is a self-locking screw shaft.

6. A thrust generating means according to claim 1, in which the screw shaft has a cup-shaped nut rotatably inserted in sealing manner into a strengthened wall of the casing and secured therein in a maner preventing axial displacement.

7. A thrust generating and pressing mechanism comprising a casing, a seal connected to said casing, a first pair of thrust-transmitting bars horizontally movable in said casing and having horizontally elongated slots therein, pin members attached to said casing and horizontally extending into the slots of said first pair of thrust-transmitting bars, a second pair of thrust transmitting bars vertically movable in said casing and having vertically elongated slots therein, additional pins attached to said casing and horizontally projecting into said slots of said second pair of thrust transmitting bars, a filter pack or cell located between said seal and said second pair of thrust transmitting bars, a link mechanism connecting a bar of the pair of horizontally movable bars with a corresponding bar of the pair of vertically movable bars, whereby horizontal movement of the pair of horizontally movable bars causes vertical movement of the pair of vertically movable bars, a screw shaft mounted in a wall of said casing and engagingly connected with a bar of the pair of horizontally movable bars with the screw shaft located substantially outside of said casing wall when said horizontally movable bars are in a pressing position whereby rotation of the screw shaft imparts a horizontal movement to the said pair of horizontally movable bars to selectively cause said filter pack or cell to be tightly pressed into sealing engagement with said seal, a set of stacked dish springs mounted on the said screw shaft in alternatively oppositely-facing directions and interposed between the end of the screw shaft within the casing and the part of the horizontally movable bar engaging the said screw shaft, said screw shaft being a self-locking screw shaft, and a cup-shaped nut rotatably inserted in sealing manner into a strengthened wall of the casing and secured therein in a manner preventing axial displacement, said nut being mounted over said screw shaft.

References Cited

UNITED STATES PATENTS

| 1,276,210 | 8/1918 | Hamelback. | |
| 1,315,727 | 9/1919 | Howard | 287—59 |
| 1,346,710 | 7/1920 | Hendershott. | |
| 2,489,712 | 11/1949 | Kelly | 74—27 |
| 2,673,964 | 3/1954 | Morton et al. | 74—57 X |
| 2,856,218 | 10/1958 | Helsel | 287—125 |
| 3,044,292 | 7/1962 | Matthews | 73—71.6 |
| 3,318,171 | 5/1967 | Wilkinson et al. | 74—89.15 |
| 3,400,596 | 9/1968 | Laich | 74—89.15 |
| 3,402,613 | 9/1968 | Neusel et al. | 74—89.15 |

FOREIGN PATENTS

| 623,295 | 1/1963 | Belgium. |
| 652,900 | 5/1951 | Great Britain. |
| 1,324,386 | 3/1963 | France. |

OTHER REFERENCES

Ball, Jr., Russell C., "Rotary to Linear Motion," Product Engineering, vol. 33, No. 7, Apr. 2, 1962, pp. 68–73.

German printed application No. 1,094,206, printed Dec. 8, 1960.

DENNIS E. TALBERT, JR., Primary Examiner

U.S. Cl. X.R.

55—481, 509; 74—89.15; 210—447, 448; 254—98